Jan. 3, 1967  R. G. BRIGHT  3,295,176
HOSE CLAMPS
Filed Nov. 5, 1964
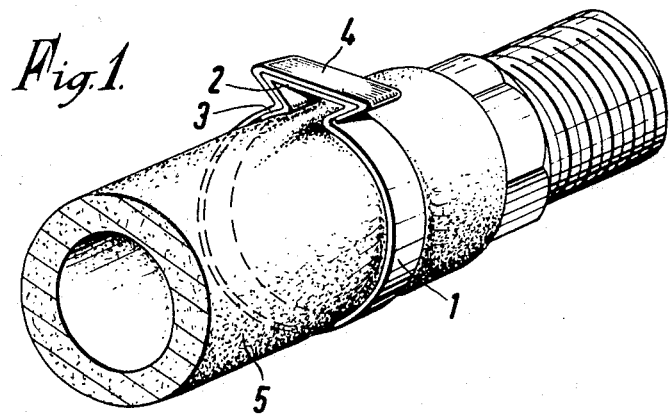
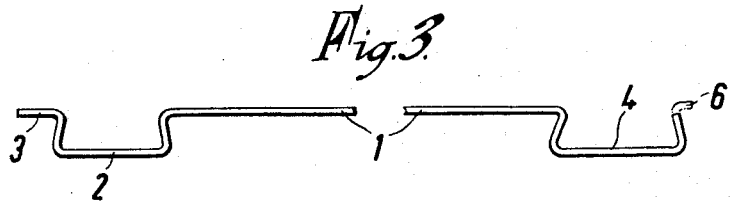
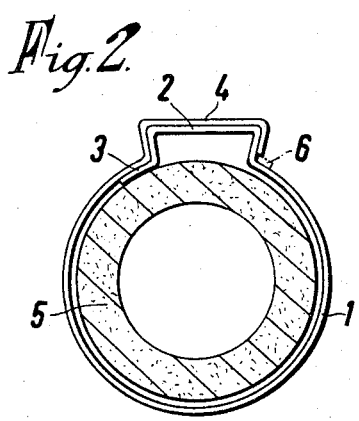
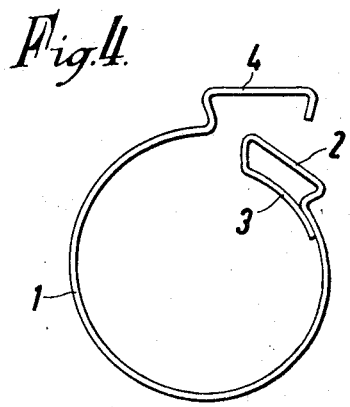
INVENTOR
ROBERT GRANVILLE BRIGHT
BY
ATTORNEYS 3,295,176
HOSE CLAMPS
Robert Granville Bright, Leamington Spa, England, assignor to Bright Manufacturing Company Limited, Coventry, Warwickshire, England
Filed Nov. 5, 1964, Ser. No. 409,061
4 Claims. (Cl. 24—20)

This invention relates to hose clamps of the kind comprising a metal clamping ring intended to embrace the hose and to be contracted by a tool to firmly grip the hose and clamp the latter in position upon the component part entering the end of the hose.

It is at present the practice to construct such hose clamps from a metal blank bent into circular shape, the ends of the blank being welded or otherwise connected together in overlapping relationship.

The blank at or near its centre point is bent into channel or dovetail section and by means of the special tool which is placed over the channel or dovetail part, the latter is caused to assume an acute dovetail form which has the effect of reducing the diameter of the clamp to contract the latter and firmly grip the hose.

Disadvantages of such a construction are that to replace a clamp it is usually necessary to first detach the hose so that the clamp can be threaded over the end whilst the clamp must also be constructed from a thickness of metal such that the dovetail part will not tend to open out under the tension in the clamp when the tool is removed.

The chief object of the invention is to evolve a hose clamp of the above type of a generally improved construction which will not be subjected to the above disadvantages.

A hose clamp of the kind set forth and in accordance with the present invention is again constructed from a blank of metal or other suitable material but in this case the ends of the blank are shaped to provide inner and outer interengaging channel or dovetail section parts which can jointly be subsequently bent by a tool into acute dovetail section to contract the clamp into gripping engagement with the hose.

It will be appreciated that the interengaging ends of the clamp can be easily separated to permit the clamp to be placed around the hose thus enabling the clamp to be applied without removing the hose from the part with which it is associated.

Furthermore, the dovetail section part of the clamp will be of double thickness and, therefore, stiffer at the bends and consequently it is possible to use a material considerably thinner than that normally employed without sacrificing rigidity where it is wanted. In this connection it will be appreciated that it is an advantage to form the plain part of the ring from a thin material so that it will adapt itself to any variations in shape of the periphery of the hose and make intimate contact therewith.

By constructing the clamp in the above manner, the clamp may be manufactured in a single operation, the welding of the ends of the blank being avoided.

Referring to the accompanying drawings:

FIGURE 1 is a perspective view of a hose clamp in accordance with the invention in position upon a hose;

FIGURE 2 is a view showing the clamp surrounding the hose but not tightened thereon;

FIGURE 3 is a side elevation of the clamp before being bent around the hose; and FIGURE 4 is a side elevation of a modified clamp bent ready for application to a hose.

The preferred form of clamp is produced from strip metal, the blank 1 at one end being bent into dovetail shape as at 2 wtih the extremity of the strip shaped to form a tongue 3 which when the clamp is in position engages the periphery of the hose. The other end of the strip is also bent into dovetail shape as at 4 but the dovetail shaped part is slightly larger to closely embrace the first dovetail part.

The tool which may be in the form of a specially shaped pair of pliers when applied to the dovetail section parts increases the acuteness of the angles of the dovetail parts as in FIGURE 1 to contract the clamp into gripping engagement with the hose 5. The dovetail parts may, if required, be actually flattened by a hammer or other tool so that they do not project to any material extent from the outer surface of the hose.

The extremity of the blank adjacent the part 4 may be shaped as shown by dotted lines at 6 in FIGURES 2 and 3 to stiffen the dovetail section part at the bend.

In the modified construction shown in FIGURE 4 the blank is so shaped that it engages the hose over its complete circumference. In this construction the extremity of the blank forming the tongue 3 is bent in the opposite direction to FIGURE 3 and is of increased length so that it bridges the mouth of the part 2 and engages the outer surface of the hose when the clamp is in position thereon.

The opposite end of the blank may if required be bent as 6 in FIGURES 2 and 3.

In use the clamp will be passed around the hose, part 4 placed in interlocking engagement with part 2 and the dovetail parts squeezed by means of the tool to increase the acuteness of the angles of the parts to contract the clamp into gripping engagement with the hose over its full circumference.

I claim:

1. A hose clamp of the kind set forth constructed from a blank of rigid flexible material, the ends of the blank being shaped to provide inner and outer interengageable interfitting means of dovetail configuration which can jointly be subsequently bent by a tool into acute dovetail section to contract the clamp into gripping engagement with the hose.

2. A hose clamp as claimed in claim 1, wherein the extremity of the blank adjacent the inner dovetail section forms a projecting tongue which engages the periphery of the hose.

3. A hose clamp as claimed in claim 1, wherein the extremity of the blank adjacent the outer dovetail section is turned outwardly as a lip to increase the thickness of material at the bend.

4. A hose clamp as claimed in claim 1, wherein a channel is formed when the dovetail sections are engaged and the extremity of the blank adjacent the inner dovetail section is bent back to bridge the channel and to engage the periphery of the hose beneath the channel, the clamp engaging the hose over the whole of its circumference.

References Cited by the Examiner

UNITED STATES PATENTS

| 297,264 | 4/1884 | Hunt _____ 24—20 |
|---|---|---|
| 512,021 | 1/1894 | Gould. |
| 866,785 | 9/1907 | Haigh _____ 285—407 |
| 909,337 | 1/1909 | Ripper _____ 40—304 |
| 2,614,403 | 10/1952 | Oetiker _____ 24—20 |
| 2,886,366 | 5/1959 | White. |

WILLIAM FELDMAN, *Primary Examiner.*

DONALD A. GRIFFIN, *Examiner.*